United States Patent
Deloche et al.

(10) Patent No.: US 10,597,886 B2
(45) Date of Patent: Mar. 24, 2020

(54) SYSTEM AND METHOD FOR CONTROLLING A HEAT PUMP FOR A SWIMMING POOL

(71) Applicant: ZODIAC POOL CARE EUROPE, Paris (FR)

(72) Inventors: Rémi Deloche, Toulouse (FR); Brice Leroyer, Angers (FR)

(73) Assignee: ZODIAC POOL CARE EUROPE, Bron (FR)

( * ) Notice: Subject to any disclaimer, the term of this patent is extended or adjusted under 35 U.S.C. 154(b) by 232 days.

(21) Appl. No.: 14/337,320

(22) Filed: Jul. 22, 2014

(65) Prior Publication Data

US 2015/0040307 A1 Feb. 12, 2015

(30) Foreign Application Priority Data

Aug. 9, 2013 (FR) .................................... 13 57945

(51) Int. Cl.
*E04H 4/12* (2006.01)
*F24D 19/10* (2006.01)
(Continued)

(52) U.S. Cl.
CPC ......... *E04H 4/129* (2013.01); *F24D 19/1054* (2013.01); *F24F 5/0071* (2013.01); *F24H 1/0081* (2013.01); *F24H 4/02* (2013.01); *F25B 30/02* (2013.01); *F25B 49/02* (2013.01); *F25B 49/025* (2013.01); *F24D 2200/123* (2013.01); *F25B 2500/12* (2013.01); *F25B 2600/01* (2013.01); *F25B 2600/021* (2013.01); *F25B 2600/0253* (2013.01); *F25B 2700/21* (2013.01); *Y02B 30/741* (2013.01)

(58) Field of Classification Search
CPC ................. E04H 4/129; F25B 2600/13; F25B 2600/025; F25B 2600/0253
USPC ............................................................ 4/493
See application file for complete search history.

(56) References Cited

U.S. PATENT DOCUMENTS 4,279,128 A * 7/1981 Leniger .................... E04H 4/129
62/238.6
4,420,947 A * 12/1983 Yoshino .............. F24D 11/0264
62/160

(Continued)

FOREIGN PATENT DOCUMENTS

FR     2979977 A1    3/2013
JP  2004309044 A   11/2004
JP  2011021828 A *  2/2011

OTHER PUBLICATIONS

JP 2011021828A_Machine_Translation.*

(Continued)

*Primary Examiner* — Erin Deery
*Assistant Examiner* — William R Klotz
(74) *Attorney, Agent, or Firm* — Kilpatrick Townsend & Stockton LLP; Dean W. Russell

(57) ABSTRACT

A swimming pool heating system, including a heat pump and control of the compressor of the heat pump according to a number of non-zero power levels, is detailed. The system includes, for example, three power levels, the first level being close to 40% of the maximum compressor speed, the second level being close to 70% of the maximum compressor speed, and the third level being close to 100% of the maximum compressor speed.

2 Claims, 6 Drawing Sheets

(51) Int. Cl.
*F24H 1/00* (2006.01)
*F24F 5/00* (2006.01)
*F24H 4/02* (2006.01)
*F25B 49/02* (2006.01)
*F25B 30/02* (2006.01)

(56) References Cited

U.S. PATENT DOCUMENTS

| | | | | |
|---|---|---|---|---|
| 4,873,649 A | * | 10/1989 | Grald | F25B 49/02 |
| | | | | 700/276 |
| 5,313,874 A | | 5/1994 | Lackstrom | |
| 7,316,267 B2 | * | 1/2008 | Kunimoto | F24D 17/02 |
| | | | | 165/240 |
| 8,459,053 B2 | * | 6/2013 | Pham | F04B 39/06 |
| | | | | 62/228.5 |
| 2008/0196445 A1 | * | 8/2008 | Lifson | F25B 49/025 |
| | | | | 62/498 |
| 2016/0097547 A1 | * | 4/2016 | Selg | F24F 13/20 |
| | | | | 62/293 |

OTHER PUBLICATIONS

JP_2004309044_Translation (Year: 2004).*
International Application No. PCT/IB2014/063313, International Search Report and Written Opinion dated Nov. 11, 2014, 10 pages.
Search Report dated Feb. 7, 2014 in priority French Application No. FR 1357945.
Australian Patent Application No. 2014304201, "First Examination Report", dated Dec. 20, 2017, 5 pages.
EP14767118.4, "Office Action", dated Nov. 2, 2018, 5 pages.

* cited by examiner

| Compressor 100% | Compressor 70% | Compressor 40% | MODE |
|---|---|---|---|
|  | ←——— Delta Pdc > 1°C | ———→ Delta Pdc < 1°C | 1 |
| ←——— Delta Pdc > 2°C | ——————— Delta Pdc > 1°C | ———→ Delta Pdc > 1°C | 2 |
| ←———→ |  |  | 3 |

Figure 3

SYSTEM AND METHOD FOR CONTROLLING A HEAT PUMP FOR A SWIMMING POOL

CROSS REFERENCE TO RELATED APPLICATION

This application claims the benefit of French Patent Application No. FR. 13 57945 filed on Aug. 9, 2013, the contents of which are incorporated herein by reference.

BACKGROUND OF THE INVENTION

The present invention relates to the field of swimming pool equipment. It relates more particularly to a heating system and a method for controlling a heat pump intended to reheat the water of a swimming pool.

PREAMBLE AND PRIOR ART

When a swimming pool is to be used outside the summer period, it is necessary to provide a device for heating the water of the swimming pool. This makes it possible to extend its period of use by several months and improve usage comfort in the summer period. The first swimming pool heating devices consisted of conventional boilers, or of devices using resistors to heat a flow of water.

These devices consume a lot of energy. Because of this, the use of heat pumps to reheat the water of a swimming pool was introduced some years ago. It does, however, come up against various drawbacks. It is in fact in particular a fairly noisy device, because of the presence of a compressor and of a fan. Moreover, the electrical consumption required to heat and maintain the water of a swimming pool at an agreeable temperature is still significant.

The aim of the invention is therefore in particular to remedy some of these drawbacks.

SUMMARY OF THE INVENTION

The invention, in a first aspect, relates to a swimming pool heating system, the swimming pool being of the type comprising a water circulation pump, characterized in that it comprises a heat pump fed by said circulation pump, and means for controlling the compressor of said heat pump according to a number of non-zero power levels, as a function of a predetermined set of setpoints and/or of environmental parameters.

The water circulation pump is, for example, the pump used to force the circulation of the swimming pool water through a filter and/or an electrolysis cell.

The heat pump concerned is advantageously, but in a nonlimiting manner, a heat pump of "inverter" type, in which the motor of the compressor can be controlled speed-wise continuously between 0 and 100% of its maximum speed.

The use of such a heat pump that has several non-zero power levels makes it possible to implement various control strategies, according to the parameters that are to be optimized.

This use does, however, go against the conventional modes of use of a heat pump for heating the water of a swimming pool.

In the prior art, a heat pump for heating the water of a swimming pool is used at maximum power, or is stopped. In practice, since the heat capacity by volume of water is 4000 times greater than that of air, it takes 4000 times longer, at equal power, to heat a litre of water than a litre of air, and the temperature of a swimming pool is therefore very stable in time. It is then natural for a person skilled in the art to consider an "all or nothing" type control of the heat pump. At the beginning of the season, the heat pump is started up at full power for the time it takes for the water to reach the desired temperature.

Then the heat pump is controlled by following a setpoint which starts up the compressor as soon as the temperature falls below a threshold value $T-\delta1$, and leaves it running until the temperature has reached a second threshold value $T+\delta2$. The pump then operates at full power typically for several hours, the time it takes to communicate the temperature difference $\delta1+\delta2$ to the volume of water in the swimming pool. Then, the compressor of the heat pump is stopped, and the temperature of the swimming pool drops back slowly by exchange with the outside environment.

In this way, the temperature of the swimming pool oscillates slowly, over a few hours, around the setpoint value T predetermined by the user.

This operating mode is considered satisfactory by a person skilled in the art. This is why few inverter-type heat pumps are used to heat the swimming pool water, whereas these devices are widely used for heating the air of a house.

In practice, for domestic heating (heating the air of the house), an all-or-nothing type control leads to stoppages and restarts that are very close together in time (for example every few minutes), and it is the stopping and the starting of the compressor which provokes its premature ageing. It is therefore desirable to reduce the number of compressor stoppages/restarts. For this, the inverter heat pump technology makes it possible to continuously control the motor of the compressor from zero to its maximum power value, and the heat pump is therefore generally left always running, but by using two power values: a maximum value, and a value close to zero, but non-zero, not causing the compressor to stop.

The problem addressed by the present invention is not to reduce the fatigue of the compressor, since the stoppages/restarts of a swimming pool heat pump are few in number in time (several orders of magnitude less numerous than for a domestic heating application, as has just been seen). The choice of a heat pump of inverter type in the present invention is not therefore linked to this problem.

The invention uses the fact that the maximum performance coefficient (COP) (that is to say the efficiency of heat power for heating the water relative to the electrical power consumed) of the heat pump is not observed for a maximum power, but for a lower power, typically of the order of 30% of the power of said pump. It is then possible to control the heat pump at maximum power, or, conversely, at maximum performance. If the heat requirement is immediate, a maximum power of the heat pump is used, even at the cost of degraded efficiency. Conversely, for a heat requirement that is not so immediate (for example for the next day), operation in optimum performance mode may be preferred.

An intermediate power level, between these maximum performance and maximum power values can be introduced. Similarly, an intermediate level varying between these two limits (maximum performance, i.e. approximately 30% of the maximum power, and 100% of this power) can also be introduced.

It is then noted that the noise level of a heat pump is directly linked to the speeds of the compressor and of the fan. The use of at least one non-maximum power level is also reflected in a substantially reduced noise level.

Numerous other strategies can then be defined, according to the constraints or outdoor conditions, and according to the choice of the users.

In accordance with what has just been stated, according to particular embodiments, possibly but not necessarily implemented in conjunction:
- one of the operating power levels is close to the power level (that is to say the compressor speed) that maximizes the performance coefficient of the heat pump.
- one of the power levels is close to the maximum power level of the heat pump (that is to say the maximum compressor speed).
- one of the power levels is an intermediate value between the power level that maximizes the performance coefficient of the heat pump and the maximum power level of the heat pump.

According to an advantageous but nonlimiting implementation, the system comprises three power levels, the first level being between 20% and 55% of the compressor speed, the second level being between 55% and 85% of the compressor speed, and the third level being between 85% and 100% of the compressor speed. It will be understood that, in this case, the heat pump comprises three power levels, respectively close to 30%, 75% and 100% of the maximum power of the heat pump.

In a usage variant, the system comprises a fourth power level, close to zero.

In a variant, the system also comprises means for measuring the temperature of the air around the swimming pool, means for measuring the temperature of the water, means for measuring the time, and means for calculating a rate of temperature rise of the water of the swimming pool.

In a second aspect, the invention relates to a method for controlling a heat pump for heating the water of a swimming pool, said pump being of the type comprising a compressor that can be controlled according to a number of non-zero power levels, the method comprising the sending to the compressor of said heat pump of power setpoints according to at least two non-zero power levels, as a function of predetermined setpoints and/or of environmental parameter measurements.

According to various implementations, the environmental parameters comprise:
- the operating time of the water circulation pump,
- the outside temperature around the swimming pool.

In one embodiment, the method comprises three power levels, the first level being between 25% and 60% of the compressor speed, the second level being between 60% and 90% of the compressor speed, and the third level being between 90% and 100% of the compressor speed.

In one embodiment, the environmental parameters comprise the operating time of a water circulation pump generating the flow of water to be reheated in the heat pump.

In one embodiment, the environmental parameters also comprise the temperature of the air around the swimming pool, means for measuring the temperature of the water, means for measuring the time, and means for calculating a rate of temperature rise of the water of the swimming pool.

In yet another aspect, the invention relates to a kit for modifying and a device for controlling a swimming pool water heating system, said kit comprising instructions for replacing a non-inverter type heat pump with an inverter heat pump and a device for controlling the compressor speed according to at least two non-zero power levels.

In this way, it is possible to modify existing swimming pool water heating systems, by replacing a heat pump of all or nothing type with a heat pump of inverter type, and by connecting thereto a unit for controlling the motor of the compressor that takes into account predetermined setpoints or environmental parameters.

The invention also relates to a kit for modifying a swimming pool water heating system, said kit comprising instructions for replacing a heat pump of non-inverter type with an inverter heat pump and a device for controlling the compressor speed according to at least two non-zero power levels, notably as a function of a triplet comprising rate of temperature rise/performance coefficient/noise, chosen by a user of said heat pump from a predetermined set of such triplets.

DESCRIPTION OF THE FIGURES

The features and advantages of the invention will be better appreciated from the following description, which explains the features of the invention through a nonlimiting exemplary application.

The description is based on the appended figures in which:

FIG. 3 is a table illustrating three operating modes of the system described, using one or more of the power levels of the motor of the compressor of the heat pump.

DETAILED DESCRIPTION OF AN EMBODIMENT OF THE INVENTION

The invention relates to a technical swimming pool environment, for example a sunken swimming pool of family type. This swimming pool is considered to be equipped with a water filtration and recirculation device comprising a circulation pump. Such a circulation pump is run in a programmed manner for several hours a day, generally approximately ten or so hours per day during summer and 2 to 4 hours per day during winter, even zero hours depending on the selected winter mode. The circulation pump is high power, this power being directly linked to the volume of the swimming pool and to the filtration device used (for example sand filter), typically allowing for a flow of 5 to 15 $m^3$ of water per hour in the filter and the swimming pool.

The swimming pool heating system as described here by way of nonlimiting example comprises, firstly, a heat pump positioned on a branch from the filtration water flow. Conventionally, such a heat pump can be run only when the circulation pump is operating. In practice, the heat pump does not generally include, by itself, means for forcing the water circulation, and is therefore dependent on the circulation pump for ensuring the existence of a flow of water to be reheated. The heat pump therefore comprises means, known per se and therefore not described further here, for knowing the state of operation of the circulation pump.

The operating time of the heating system is therefore limited, each day, to the operating time of the circulation pump, which constitutes a daily filtration cycle.

The heat pump used here is of the "inverter" type, known per se, and notably used for heating air in homes. It comprises a compressor driven by a motor whose speed is variable and can be controlled continuously between a zero value and a maximum value.

Figure 1:
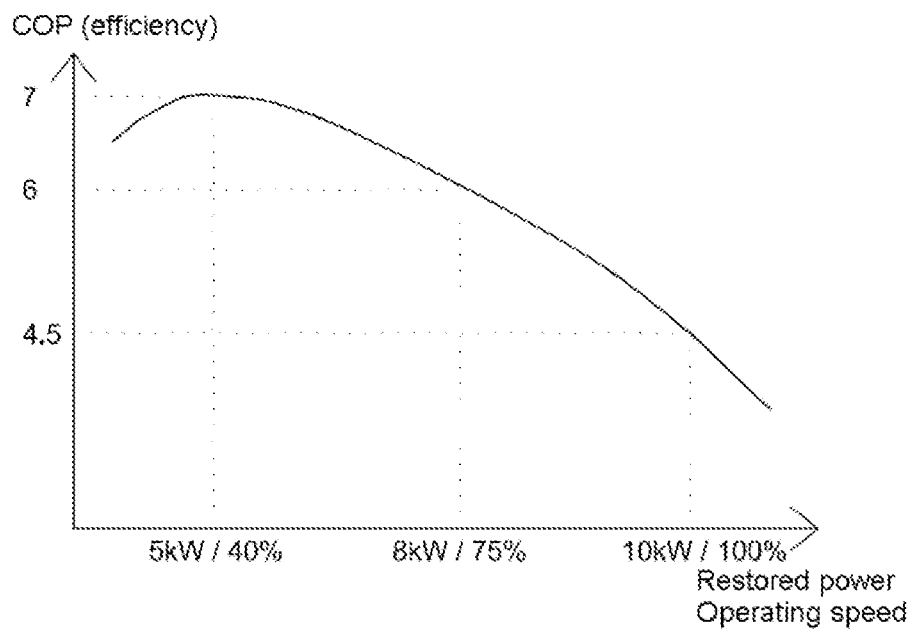
FIG. 1 illustrates the performance curve of a heat pump as a function of the operating speed of the motor of the compressor of said pump.

It is known that the efficiency curve, measured by the performance coefficient of the heat pump, varies as a function of the restored power, which is directly linked to the speed of the motor of the compressor. As can be seen in FIG. 1, this curve exhibits a local maximum for a restored power situated around 30% of the maximum power (that is to say for a speed of 40% of the maximum speed of the motor of the compressor). In the present nonlimiting example, the heat pump exhibits an efficiency of 7 for a restored power of 30%, an efficiency of 6 for a restored power of 75%, and an efficiency of approximately 4.5 for a restored power of 100%. Below a restored power of 30%, the efficiency of the heat pump also decreases.

The heat pump used in the system described here comprises means for controlling the speed of the motor of the compressor. These control means, of electronic and/or software nature, make it possible to operate the motor at at least two non-zero speeds, here three non-zero speeds, close to the value corresponding to the maximum performance coefficient (here 30%) of the heat pump, 100% of the maximum speed of the motor of the compressor, and an intermediate value (here 75%).

These speeds can naturally be chosen to be of sufficiently distinct different values, inasmuch as they result in at least two different values of the heat pump performance coefficient.

Figure 2:
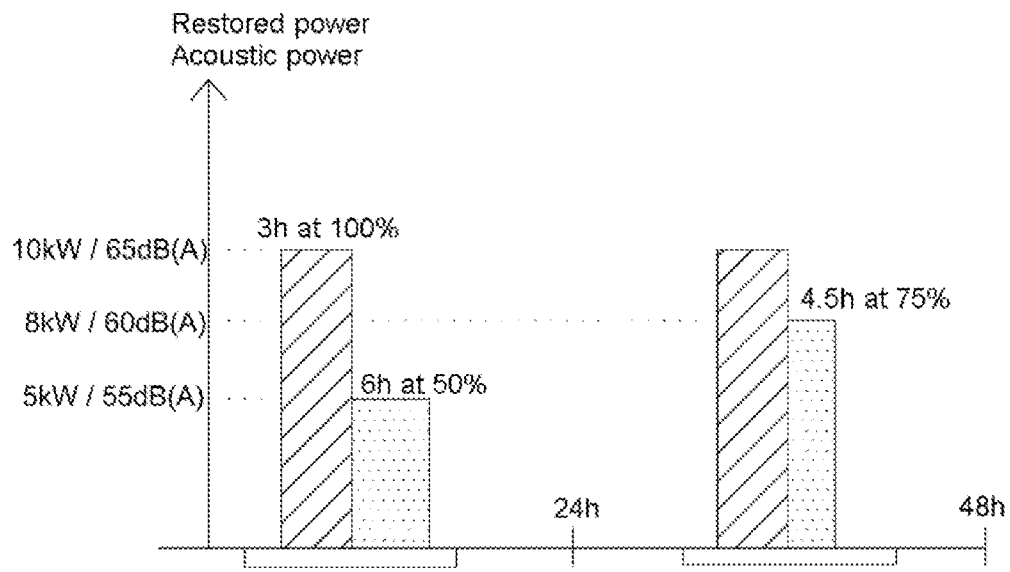
FIG. 2 illustrates the possibilities for controlling a system as explained, in a swimming pool operating cycle.

As can be seen in FIG. 2, it is possible, for one and the same heat power level restored to the water of the swimming pool, to envisage different heating strategies.

In the case of FIG. 2, for one and the same daily filtration time of 8 hours for the water of a swimming pool, that is to say circulation pump operating time, it is possible to use a heating at full power for 3 hours, restoring for this time a heat power of 30 kWh, with an indicative noise level of 65 dB(A), or to heat in maximum COP mode (30% speed) for 6 hours with one and the same restored heat power and a noise level of 55 dB(A) (left-hand part of the graph), or to heat in intermediate mode (75% speed) for 4.5 hours still with a restored heat power of 30 kWh and a noise level of 60 dB(A) (right-hand part of the graph). In the first case (maximum power), the consumed power was 6.7 kWh, in the second case (maximum COP), it was 4.3 kWh, in the intermediate case, it was 5 kWh. The most economical mode is therefore translated into a slower heating, but with a lower energy consumption and a lower noise level.

The heating system also comprises, in the present nonlimiting example, means for a user to enter control setpoints, such as, for example, a request for a heating strategy that minimizes the electrical consumption, or heating strategy that minimizes the noise within a certain time band, etc. The input of these control setpoints can, in a particular but nonlimiting embodiment, be embodied by the actuation of knobs by the user.

In the present exemplary embodiment, the system notably comprises three modes M1, M2, M3 corresponding to the following setpoints:
M1—minimization of the energy consumption and of the noise level,
M2—intermediate control,
M3—fast heating.

In the present exemplary implementation, the mode M1 for minimizing the energy consumption covers a control that uses, in its normal operating mode (see detail below), in addition to the zero speed phases V0 (0%) of the compressor, the low speed V3 (30%) and the intermediate speed V2 (75%) of the compressor.

Similarly, the intermediate control mode M2 covers a control according to the three compressor speeds V1, V2, V3, in addition to the zero speed phases V0 (0%).

Finally, in this nonlimiting example, the fast heating mode M3 covers a control according to just the maximum speed V1 (100%) of the compressor of the heat pump, in addition to the zero speed phases V0 (0%).

The swimming pool water heating system comprises, secondly, means for measuring environmental parameters, comprising, for example but in a nonlimiting manner, the temperature of the ambient air around the swimming pool. The heating system also comprises in this exemplary embodiment means for analyzing the variation of the temperature of the swimming pool as a function of time.

In a particular control mode, when the rate of temperature rise, measured over a predetermined duration, for example a few hours, is below a predetermined threshold, the heat pump changes operating mode for the immediately higher mode in terms of compressor speed.

Operating Mode

As stated above, in the present exemplary embodiment, the system notably comprises three modes corresponding to the following setpoints:
M1—minimization of the energy consumption and of the noise level,
M2—intermediate control,
M3—fast heating.

Figure 4:
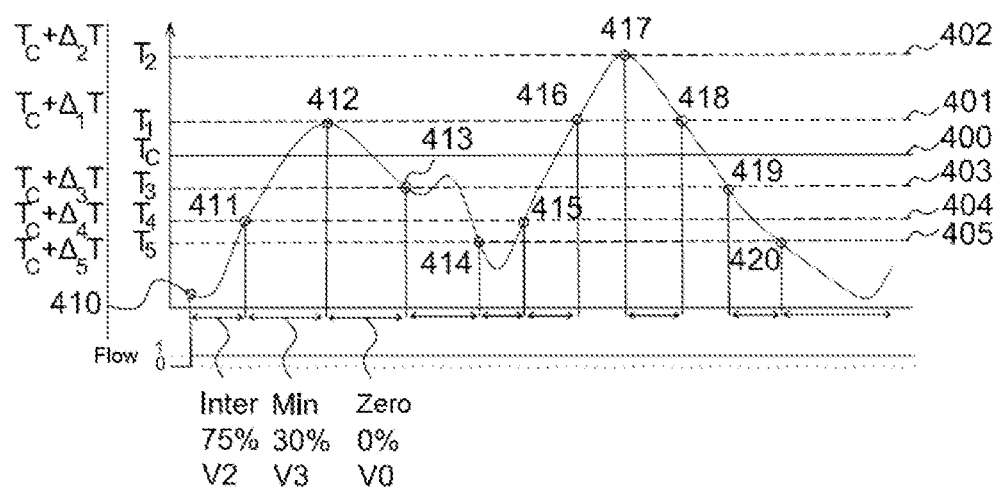
FIG. 4 illustrates an example of a first mode of operation of the method.

FIG. 4 illustrates, in a purely hypothetical example given here by way of example, the trend of the temperature of the water in a swimming pool basin (on the y axis) over time (on the x axis), when using the operating mode M1 of "minimization of the energy consumption and of the noise level" type.

It is assumed, for the purposes of this example, that the setpoint temperature $T_C$ of the water requested by the user is 28° C. This corresponds to line 400 in the figure.

The method here uses a number of temperature thresholds which determine the choice of the operating speeds of the compressor in this mode M1:
a near higher threshold $T1=T_C+\Delta 1T$, here set at 28.5° C., that is to say 0.5° C. above the setpoint temperature (but any other temperature difference $\Delta 1T$ can also be used). This temperature T1 corresponds to line 401 in FIG. 4.
a far higher threshold $T2=T_C+\Delta 2T$, here set at 30° C., that is to say 2° C. above the setpoint temperature (any other temperature difference $\Delta 2T$ also being able to be used). This temperature T2 corresponds to line 402 in FIG. 4.
a near lower threshold $T3=T_C-\Delta 3T$, here set at 27.5° C., that is to say 0.5° C. below the setpoint temperature (but here again any other temperature difference $\Delta 3T$ can also be used). This temperature T3 corresponds to line 403 in FIG. 4.
an intermediate lower threshold $T4=T_C-\Delta 4T$, here set at 26.5° C., that is to say 1.5° C. below the setpoint temperature (any other temperature difference MT also being able to be used). This temperature T4 corresponds to line 404 in FIG. 4.
a far lower threshold $T5=T_C-\Delta 5T$, here set at 26° C., that is to say 2° C. below the setpoint temperature (any other temperature difference Δ5T also being able to be used). This temperature T5 corresponds to line 405 in FIG. 4.

Some of these thresholds may possibly be merged.

The method defines, for a given triplet (crossing of a threshold temperature, direction in which this threshold is crossed, previous compressor speed), the next compressor speed.

As can then be seen in FIG. 4, it is assumed that the initial temperature T of the basin is approximately 24° C. (point 410), at the start of implementation of the mode M1.

In this situation, upon the command to start up the mode M1 by the user, the temperature T being below the far lower threshold T5 (here 26° C.), the method orders the compressor to start up at intermediate speed V2 (here 75% of the maximum speed) so as to rapidly but with limited noise reach a temperature considered to be sufficiently close to the setpoint value. This speed V2 remains applied as long as the temperature of the water T remains below the intermediate lower threshold T4 (here 26.5° C.).

Then, when the temperature reaches this value T4 (point 411 on the temperature curve), the method orders the compressor to run at low speed V3 (here 30% of the maximum speed). This low speed V3 remains applied as long as the temperature of the water T remains below the near higher threshold T1 (here 28.5° C.). At that instant (point 412 on the curve), the compressor is stopped, and the temperature drops normally gradually (if the outdoor temperature is below 28.5° C.).

When this temperature passes (point 413) below the near lower threshold T3 (here 27.5° C.), the compressor is restarted at low speed V3, which should gradually raise the temperature towards the near higher threshold T1, which would once again order the compressor to stop.

In "normal" operation during the day, the temperature of the water will change between the near lower threshold T3 and near higher threshold T1 values, the compressor being alternatively stopped and set to low speed V3 to maintain a temperature between these values T1, T3 considered to be sufficiently close to the setpoint value.

The control steps described above correspond to the "normal" operation of the compressor in this mode M1 for minimization of the energy consumption and of the noise level.

Case of a Downward Temperature Swing

If, during this low speed phase V3 (after the point 413), the temperature falls again (point 415) below the far lower threshold temperature T5 (here 26° C.), the compressor switches to intermediate speed V2, which has the effect of raising the temperature. Here again, this speed V2 remains applied as long as the temperature of the water T remains below the intermediate lower threshold T4 (here 26.5° C.).

Once again, when the temperature reaches this value T4 (point 415 on the temperature curve), the method orders the compressor to switch to low speed V3. This low speed V3 remains applied as long as the temperature of the water T remains below the near higher threshold T1 (here 28.5° C.). At that instant (point 416 on the curve), the compressor is stopped.

Case of an Upward Temperature Swing

If, after passing this point 416, and while the compressor is stopped, it happens that the temperature of the water in the basin continues to rise (case of abnormal operation, for example linked to an outdoor temperature significantly higher than 30° C. in the present example), when this temperature reaches the far higher threshold T2 (point 417), the compressor is started up in cooling mode at maximum speed V1, until the temperature of the water drops back below the near higher threshold value T1 (point 418). The operation of the mode M1 then reverts to its "normal" cycle, with the compressor switching to zero speed.

The points 419, 420 then correspond to situations similar to the points 413, 414 cited previously, with identical compressor commands in these conditions.

Figure 5:
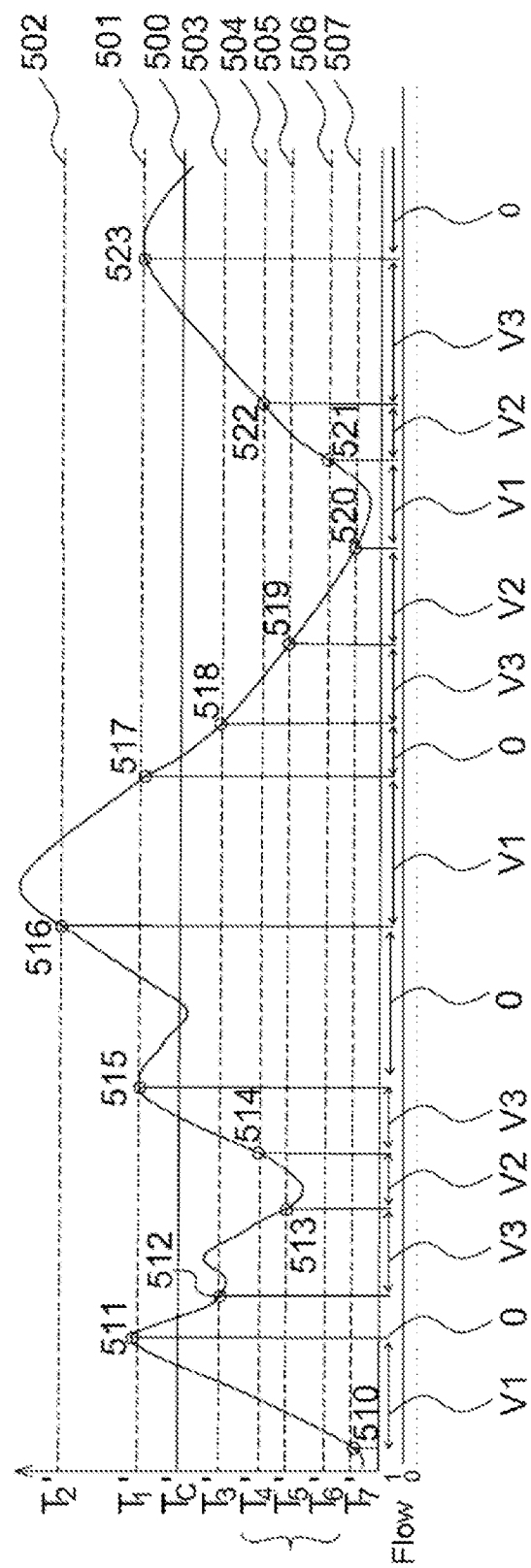
FIG. 5 illustrates an example of a second mode of operation of the method.

FIG. 5 illustrates, in a similar manner, in a purely hypothetical example given here by way of example, the trend of the temperature of the water in a swimming pool basin (on the y axis) over time (on the x axis), when using the operating mode M2 of "intermediate control" type.

It is assumed here again, for the purposes of this example, that the setpoint temperature $T_C$ of the water requested by the user is 28° C. This corresponds to line 500 in FIG. 5.

The method here uses a number of temperature thresholds which determine the choice of the compressor operating speeds in this mode M2:

- a near higher threshold T1'=$T_C$+Δ1T', here set at 28.5° C., that is to say 0.5° C. above the setpoint temperature (but any other temperature difference Δ1T' can also be used). This temperature T1' corresponds to line 501 in FIG. 5.
- a far higher threshold T2'=$T_C$+Δ2T', here set at 30° C., that is to say 2° C. above the setpoint temperature (any other temperature difference Δ2T' also being able to be used). This temperature T2' corresponds to line 502 in FIG. 5.
- a near lower threshold T3'=$T_C$−Δ3T', here set at 27.5° C., that is to say 0.5° C. below the setpoint temperature (but here again any other temperature difference Δ3T can also be used). This temperature T3' corresponds to line 503 in FIG. 5.
- a first intermediate lower threshold T4'=$T_C$−Δ4T', here set at 27° C., that is to say 1° C. below the setpoint temperature (any other temperature difference Δ4T' also being able to be used). This temperature T4' corresponds to line 504 in FIG. 5,
- a second intermediate lower threshold T5'=$T_C$−Δ7T', here set at 26.5° C., that is to say 1.5° C. below the setpoint temperature (any other temperature difference Δ5T' also being able to be used). This temperature T5' corresponds to line 505 in FIG. 5,
- a third intermediate lower threshold T6'=$T_C$−Δ6T', here set at 26° C., that is to say 2° C. below the setpoint temperature (any other temperature difference Δ6T' also being able to be used). This temperature T6' corresponds to line 506 in FIG. 5,
- a far lower threshold T7'=$T_C$−Δ7T, here set at 25° C., that is to say 3° C. below the setpoint temperature (any other temperature difference Δ7T' also being able to be used). This temperature T7' corresponds to line 507 in FIG. 5.

Here again, some of these thresholds can possibly be merged.

The method defines, for a given triplet (crossing of a threshold temperature, direction in which this threshold is crossed, previous compressor speed), the next compressor speed.

As can then be seen in FIG. 5, it is assumed that the initial temperature T of the basin is approximately 24° C. (point 510), at the start of implementation of the mode M2.

In this situation, upon the command to start up the mode M2 by the user, and the temperature T being below the far lower threshold T5 (here 26° C.), the method orders the compressor to run at maximum speed V1 (here 100% of the maximum speed) so as to reach the setpoint temperature as rapidly as possible. This speed V1 remains applied as long as the temperature of the water T remains below the near higher threshold T1' (here 28.5° C.).

Then, when the temperature reaches this value T1' (point 511 on the temperature curve), the method orders the compressor to stop. This zero speed remains applied as long as the temperature of the water T remains above the near lower threshold T3' (here 27.5° C.). At that instant (point 512 on the curve), the compressor is started up again at low speed V3, which should gradually raise the temperature towards the near higher threshold T1', which would once again order the compressor to stop.

In "normal" operation during the day, the temperature of the water will change between the near lower threshold T3' and near higher threshold T1' values, the compressor being alternately stopped and started at low speed V3 to maintain a temperature between these values T1', T3' considered to be sufficiently close to the setpoint value (a half degree on either side).

The control steps described above correspond to the "normal" operation of the compressor in this "intermediate control" mode M2.

Case of a Downward Temperature Swing

If, during this low speed phase V3, the temperature drops back (point 513) below the second intermediate lower threshold temperature T5' (here 26.5° C.), the compressor switches to intermediate speed V2 (75% of the maximum speed), which has the effect of raising the temperature. This speed V2 remains applied as long as the temperature of the water T remains below the first intermediate lower threshold T4' (here 27° C.).

When the temperature reaches this value T4' (point 514 on the temperature curve), the method orders the compressor to switch to low speed V3. This low speed V3 remains applied as long as the temperature of the water T remains below the near higher threshold T1' (here 28.5° C.). At that instant (point 515 on the curve), the compressor is stopped.

Case of an Upward Temperature Swing

As in the mode M1, if, after passing this point 515, and while the compressor is stopped, it happens that the temperature of the water in the basin continues to rise, when this temperature reaches the far higher threshold T2' (point 516), the compressor is started up in cooling mode at maximum speed V1, until the temperature of the water drops back below the near higher threshold value T1' (point 517). The operation of the mode M2 then reverts to its "normal" cycle, with the compressor switching to zero speed.

The points 518, 519 then correspond to situations similar to the points 512, 513 cited previously, with compressor commands that are identical in these conditions.

If the temperature passes below (point 520) the far lower threshold value T7' (here 25° C.), the compressor switches to maximum heating speed V1. It remains in that state as long as the temperature remains below the third intermediate lower threshold T6' (here 26° C.). The compressor speed is then (point 521) adjusted to the intermediate speed V2 (75% of the maximum speed). It remains at that value V2 until the second intermediate lower threshold temperature T4' (here 27° C.) is crossed (point 522). This point 522 is characterized by entry conditions that are identical to those of point 514, and the control of the compressor is therefore identical (switch to low speed V3) thereto. The point 523 is then equivalent to the point 515 described above.

Figure 6:
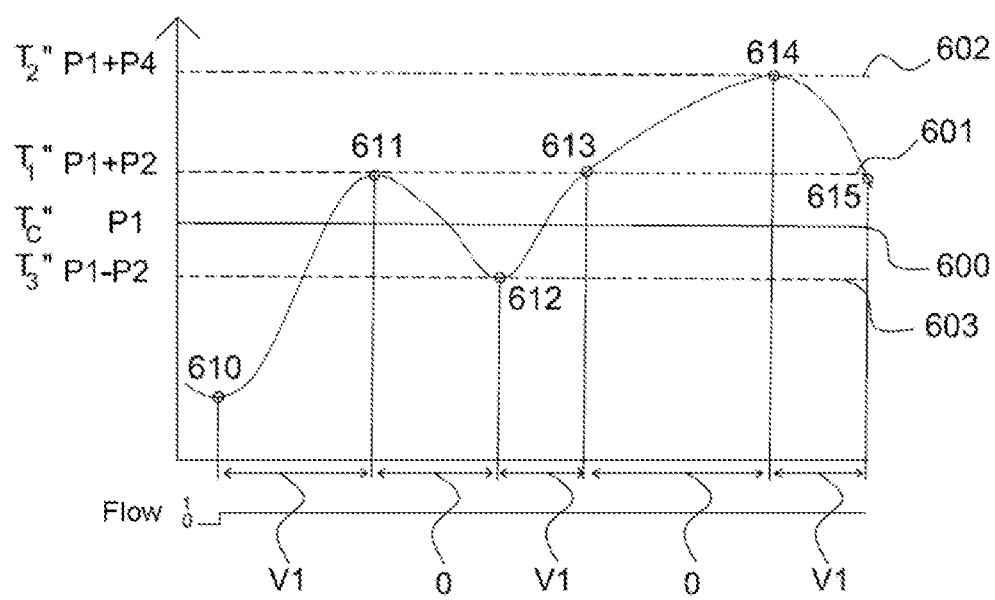
FIG. 6 illustrates an example of a third mode of operation of the method.
Figure 7:
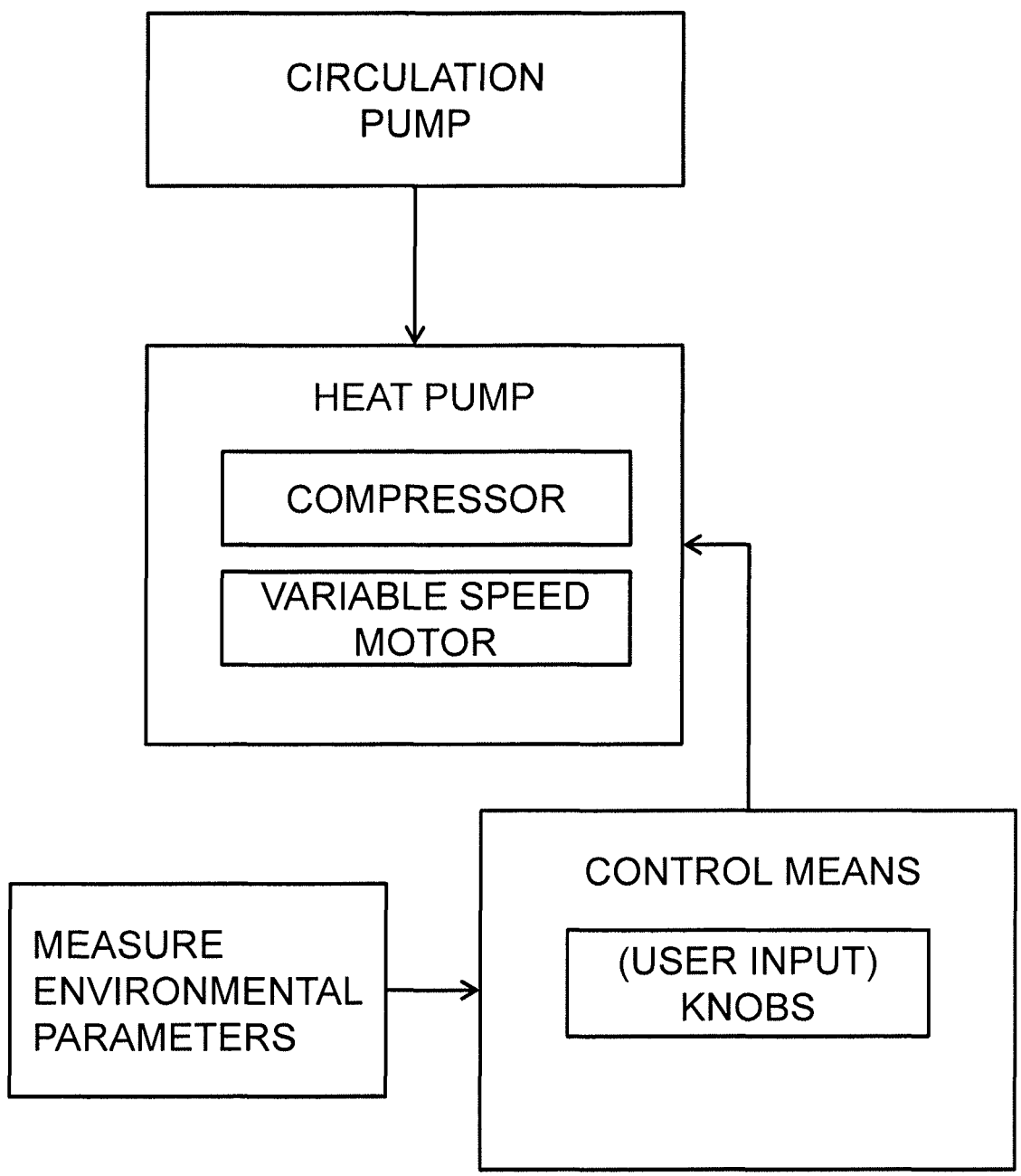
FIG. 7 schematically illustrates certain equipment identified herein.

FIG. 6 illustrates, in a purely hypothetical example given here by way of example, the trend of the temperature of the water in a swimming pool basin (on the y axis) over time (on the x axis), when using the operating mode M3 of "fast heating" type.

It is assumed, for the purposes of this example, that the setpoint temperature $T_C$ of the water requested by the user is 28° C. This corresponds to line 600 in the figure.

The method here uses a number of temperature thresholds which determine the choice of the compressor operating speeds in this mode M3:

a near higher threshold $T1''=T_C+\Delta1T''$, here set at 28.5° C., that is to say 0.5° C. above the setpoint temperature (but any other temperature difference $\Delta1T''$ can also be used). This temperature T1" corresponds to line 601 in FIG. 6.

a far higher threshold $T2''T_C+\Delta2T''$, here set at 30° C., that is to say 2° C. above the setpoint temperature (any other temperature difference $\Delta2T''$ also being able to be used). This temperature T2" corresponds to line 602 in FIG. 6.

a near lower threshold $T3''=T_C\Delta3T''$, here set at 27.5° C., that is to say 0.5° C. below the setpoint temperature (but here again, any other temperature difference $\Delta3T''$ can also be used). This temperature T3" corresponds to line 603 in FIG. 6.

Some of these thresholds can possibly be merged.

The method defines, for a given triplet (crossing of a threshold temperature, direction in which this threshold is crossed, previous compressor speed), the next compressor speed.

As can then be seen in FIG. 6, it is assumed that the initial temperature T of the basin is approximately 24° C. (point 610), at the start of implementation of the mode M1.

In this situation, upon the command to start up the mode M3 by the user, the temperature T being below the near lower threshold T3" (here 27.5° C.), the method orders the compressor to start up at maximum speed V1 so as to reach the setpoint temperature value as rapidly as possible. This speed V1 remains applied as long as the temperature of the water T remains below the near higher threshold T1" (here 28.5° C.).

Then, when the temperature reaches this value T1" (point 611 on the temperature curve), the method orders the compressor to stop. This stoppage of the compressor remains applied as long as the temperature of the water T remains above the near lower threshold T3" (here 27.5° C.).

At that instant (point 612 on the curve), the compressor is restarted at maximum speed V1, and the temperature rises back up towards the near higher threshold temperature T1" (point 613).

In "normal" daytime operation, the temperature of the water will change between the near lower threshold T3" and near higher threshold T1" values, the compressor being alternately stopped and started up at low speed to maintain a temperature that lies between these values considered to be sufficiently close to the setpoint value.

Case of an Upward Temperature Swing

If, after passing this point 613, and while the compressor is stopped, it happens that the temperature of the water in the basin continues to rise, when this temperature reaches the far higher threshold T2" (point 614), the compressor is started up in cooling mode at maximum speed V1, until the temperature of the water drops back below the near higher threshold value T1" (point 615). The operation of the mode M1 then reverts to its "normal" cycle with the compressor switching to zero speed.

These control laws for the various modes described are given here by way of example. They can naturally be replaced or complemented by other control laws, for example according to an observed prior behaviour, or according to data from outdoor sensors.

Variants

In a variant embodiment, the circulation pump exhibits a variable operating speed, controlled by the heat pump, according to a flow rate demand calculated as a function of the mode of operation of said heat pump. It is also possible to force the starting up of the circulation pump by the heat pump, notably in response to an instruction to raise the temperature as rapidly as possible.

The invention claimed is:

1. A method of controlling a circulation system for water for a swimming pool, the circulation system comprising a circulation pump, a filtration device, a heat pump, and means for controlling operation of the heat pump, the method comprising:
   a. causing operation of the circulation pump so as to move water of the swimming pool to the filtration device for filtering and the heat pump for heating; and
   b. entering into a control means (i) a desired temperature of the water of the swimming pool and (ii) a desired operating mode in order to control an operating speed of a variable-speed motor of the heat pump only when the circulation pump is operating, the desired operating node being selected from among the following operating modes: (A) a first operating mode corresponding to a first heating strategy that minimizes energy consumed by the heat pump while heating the water of the swimming pool to the desired temperature; (B) a second operating mode corresponding to a second heating strategy that maximizes energy consumed by the heat pump while heating the water of the swimming pool to the desired temperature; and (C) a third operating mode corresponding to a third heating strategy in which the energy consumed by the heat pump while heating the water of the swimming pool to the desired temperature is between the minimum and maximum energies.

2. A method of controlling a circulation system for water for a swimming pool, the circulation system comprising a circulation pump, a filtration device, a heat pump, and means for controlling operation of the heat pump, the method comprising:
   a. causing operation of the circulation pump so as to move water of the swimming pool to the filtration device for filtering and the heat pump for heating; and
   b. entering into a control means (i) a desired temperature ($T_C$) of the water of the swimming pool and (ii) a desired operating mode in order to control an operating speed of a variable-speed motor of the heat pump, the desired operating mode corresponding to a heating strategy that minimizes energy consumed by the heat pump while heating the water of the swimming pool to the desired temperature ($T_C$), thereby causing the operating speed of the variable-speed motor of the heat pump to be controlled as follows:
   at an intermediate speed (V2) when the temperature of the water of the swimming pool is below an intermediate lower threshold temperature (T4);
   at a low speed (V3) when the temperature of the water of the swimming pool is increasing between the intermediate lower threshold temperature (T4) and a near higher threshold (T1);
   at zero speed when the temperature of the water of the swimming pool is above the near higher threshold (T1); and
   at zero speed when the temperature of the water of the swimming pool is decreasing between the near higher threshold (T1) and a near lower threshold (T3);
   wherein:
   (A) V3<V2;
   (B) both V3 and V2 are less than the maximum operating speed of the variable-speed motor of the heat pump; and
   (C) $T4<T3<T_C<T1$.

* * * * *